Patented Mar. 13, 1928.

1,662,626

UNITED STATES PATENT OFFICE.

HAROLD S. ADAMS AND LUDWIG MEUSER, OF NAUGATUCK, CONNECTICUT, ASSIGNORS TO THE NAUGATUCK CHEMICAL COMPANY, A CORPORATION OF CONNECTICUT.

PROCESS FOR THE MANUFACTURE OF DIPHENYLGUANIDINE.

No Drawing.    Application filed June 19, 1922.    Serial No. 569,427.

This invention relates to processes for the manufacture of disubstituted guanidines, and more particularly to the manufacture of diphenylguanidine.

Various methods for the preparation of diphenylguanidine have been proposed involving a reaction of aniline with halide derivatives of cyanogen, and aniline with mercurammonium derivatives of the fulminates. The objections to these methods are obvious. More practical methods have been proposed involving the desulphurization of thiocarbanilid dissolved in alcohol or some other suitable organic solvent by means of metallic oxides in the presence of ammonia or an ammonium salt. Methods such as this are objectionable because of the necessity of recovery of organic solvent which is a serious difficulty in large scale operations as well as an expensive process. In addition methods of this type give rise to one or more byproducts such as phenyl mustard oil, triphenylguanidine, tetraphenylbiguanide, diphenylurea, monophenylthiourea, phenyl-cyanamide, carbodiphenylimide and aniline. Another method proposed comprises the desulphurization of thiocarbanilid dissolved in a mixture of strong aqueous caustic soda and ammonia by means of litharge but this method has proved unsatisfactory in practical use.

The principal object of the present invention accordingly is to overcome the objections in the processes heretofore proposed and to provide a simple, efficient and inexpensive method for the preparation of the disubstituted guanidines.

The invention accordingly consists in treating an aqueous suspension of a symmetrical disubstituted thiourea with a compound of a metal capable of removing sulphur from this thiourea in the presence of ammonia and recovering a disubstituted guanidine.

In its preferred form, the process consists in placing 1500 lbs. of thiocarbanilid in a jacketed vessel provided with means for agitating its contents and capable of standing an internal pressure of 40 to 50 lbs. 675 lbs, of zinc oxide are added and 3000 lbs. of strong aqueous ammonia. The vessel is now closed, the stirrer started and the temperature of the jacket, by means of circulating hot water or by some other suitable means, is raised to from 70 to 80° C. The disubstituted thiourea or thiocarbanilid is introduced in the form of a finely ground powder and upon stirring readily forms a suspension in the ammonia solution employed. It is important that the temperature be maintained approximately within the limits mentioned. The optimum temperature for the reaction is 65 to 70° C. Below this temperature reaction takes places too slowly. At higher temperatures, diphenylguanidine is formed, but it further undergoes hydrolysis with the result that the product may consist of a gum containing more or less free aniline. It is because of the danger of local overheating that the temperature of the jacket should preferably not exceed 80° C. The pressure within the vessel due to the presence of water and ammonia rises to about 40 lbs. and practically so remains.

The reaction is allowed to proceed until a sample tested by suitable means shows that the desulphurization of the thiocarbanilid is complete. In practice the reaction is complete in about ten hours. While still hot it is convenient to discharge the ammonia vapor into a suitable absorption system where it may be dissolved in water and used again. Practically all of the excess ammonia may be recovered. It will be noted that a small excess of zinc oxide is used. This is done in order to insure complete desulphurization of the thiocarbanilid, but it is to be understood that the amount of zinc oxide above the theoretical requirement practically is unnecessary. Other metal compounds may be used such as lead carbonate or oxide. Zinc oxide is preferable on account of the light color of its sulphide which makes it possible to use the product without further separation of zinc sulphide and permits the use of the product in rubber compounds which are white or delicately colored.

An excess of aqueous ammonia is employed it will be noted. The amount and concentration of the ammonia may be varied as desired. The specific gravity of the solution employed is less than about 1. The quantity specified is preferred since it permits ready stirring of the reaction mixture and increases the speed of the reaction.

After the removal of the ammonia, the reaction mixture contains diphenylguanidine, zinc sulphide, zinc oxide in accordance with the excess used, and water. Since none of the substances other than diphenylguanidine interferes with the action of the latter, this mixture may be filtered by any suitable method, washed, dried and ground, and employed as such if desired. If it is desired to separate the accelerator, diphenylguanidine, from the metallic sulphide and oxide, the following procedure may be carried out:—
Hydrochloric acid is added to the mixture in an amount at least sufficient to decompose the zinc sulphide and oxide, as well as to form the hydrochloride of the diphenylguanidine. The mixture is boiled and water added, if necessary, to effect solution. Hydrogen sulphide is evolved and may be collected to precipitate the zinc as described hereinafter. Hydrochloric acid is employed because of the easy solubility of zinc chloride and diphenylguanidine hydrochloride in water. Any acid having similar properties may be employed. Any unchanged thiocarbanilid, as well as insoluble impurities originally present in this product, will remain undissolved. While the solution is still hot and preferably before crystallization of a double salt of diphenylguanidine and zinc consisting of one molecule each of zinc chloride and diphenylguanidine hydrochloride, which may occur if the solution is cooled, excess acidity is neutralized by sodium acetate. The weight of sodium acetate added is approximately equal to the calculated weight of the double zinc salt capable of being formed upon cooling of the solution. If desired instead of neutralizing entirely with sodium acetate, a part of the acid may be neutralized with sodium carbonate, sodium hydrate or other alkali, with the subsequent addition of sodium acetate; or sodium hydroxide or similar alkali may be employed with acetic acid; or another salt of a strong base and a weak acid may be employed. The important feature to be observed is that the material or materials employed to substitute sodium acetate should be capable of permitting the zinc to be precipitated as the sulphide while the base diphenylguanidine remains in solution as the salt.

After the addition of the sodium acetate or its equivalent hydrogen sulphide is passed into the solution until the zinc is completely precipitated as the sulphide after which the solution is filtered whereupon the zinc sulphide or other insoluble impurities are removed. From this solution the diphenylguanidine may be precipitated by neutralizing with a suitable alkali whereupon it is filtered, washed, dried and ground.

The method may be varied, after the sodium acetate has been added, by adding an amount of acetic acid equivalent to the hydrogen sulphide required, and generating the hydrogen sulphide in the solution itself, for example by running in a solution of sodium sulphide, whereupon the zinc sulphide is precipitated and removed as above.

If lead oxide has been used instead of zinc oxide as suggested above, the mixture of base and metallic sulphide may be separated by digesting with sulphuric acid and filtering the solution of the diphenylguanidine sulphate from insoluble lead sulphate and sulphide.

Having thus described our invention, what we claim and desire to protect by Letters Patent is:

1. A process of the kind described which comprises treating a suspension of a water insoluble symmetrical disubstituted thiourea in water containing ammonia with a compound of a metal capable of removing sulphur from the thiourea, and recovering a disubstituted guanidine.

2. A process of the kind described which comprises treating a suspension of thiocarbanilid in water containing ammonia with a compound of a metal capable of removing sulphur from the thiocarbanilid, and recovering diphenylguanidine.

3. A process of the kind described which comprises treating a water suspension of thiocarbanilid with a compound of zinc in the presence of ammonia, and recovering diphenylguanidine.

4. A process of the kind described which comprises heating a water suspension of thiocarbanilid, a compound of zinc, and ammonia to 70-80° C., and recovering the material resulting from the reaction.

5. A process of the kind described which comprises treating a water suspension of thiocarbanilid with an excess of zinc oxide in the presence of ammonia and recovering a mixture of diphenylguanidine, zinc sulphide and zinc oxide.

6. A process of the kind described which comprises combining the following ingredients in approximately the proportions stated: thiocarbanilid 1500 lbs., zinc oxide 675 lbs., strong aqueous ammonia 3000 lbs., maintaining the temperature of the mixture at approximately 70-80° C. until the thiocarbanilid is substantially desulphurized, removing the excess of ammonia, and recovering the material resulting from the reaction.

7. A process of the kind described which comprises dissolving a mixture of diphenylguanidine, zinc sulphide and zinc oxide in an acid, neutralizing the excess of acid, adding a weak acid to the solution so formed, an excess of the added acid being of sufficient strength to permit the precipitation of zinc sulphide while permitting the stronger acid salt of diphenylguanidine to remain in solution, precipitating zinc sulphide, separating the zinc sulphide formed, and recovering the diphenylguanidine.

Signed at Naugatuck, Connecticut, this 15th day of June, 1922.

HAROLD S. ADAMS.

Signed at Naugatuck, Connecticut, this 15th day of June, 1922.

LUDWIG MEUSER.